United States Patent [19]
King, Jr.

[11] 3,868,189
[45] Feb. 25, 1975

[54] FASTENER ASSEMBLY
[76] Inventor: John O. King, Jr., 399 N. Ivy Rd., Atlanta, Ga. 30342
[22] Filed: Jan. 11, 1973
[21] Appl. No.: 322,799

Related U.S. Application Data
[63] Continuation-in-part of Ser. No. 268,478, July 3, 1972.

[52] U.S. Cl. .................. 403/12, 81/13, 85/1 P, 151/15, 151/21 C, 151/41.74
[51] Int. Cl. .................. F16b 5/02, F16b 29/00
[58] Field of Search ............ 403/11, 12, 13; 81/10, 81/13; 85/1 P, 50, 70, 77; 151/15, 21 C, 41.74

[56] References Cited
UNITED STATES PATENTS

| | | | |
|---|---|---|---|
| 1,320,622 | 11/1919 | Kennedy | 85/70 |
| 1,628,355 | 5/1927 | Clapp | 151/21 C |
| 2,526,910 | 10/1950 | Smith | 85/1 P |
| 2,787,051 | 4/1957 | Risley | 85/1 P |
| 3,095,044 | 6/1963 | Medlok | 81/10 |
| 3,271,058 | 9/1966 | Anderson | 151/41.74 X |

Primary Examiner—Werner H. Schroeder
Attorney, Agent, or Firm—B. J. Powell

[57] ABSTRACT

An assembly for fastening together work pieces having aligned holes therethrough and one side of limited accessibility which includes a fastener with a head, support shank and externally threaded engagement portion to be engaged by a conventional nut. The engagement portion is internally threaded oppositely to the external threads and a guide member is provided that can be screwed into the internal threads. The guide member is flexible so that it can be inserted through the holes until the fastener can be screwed thereon and used to pull the fastener into the holes from the side of limited accessibility. A tubular sleeve member is slipped over the fastener from the easily accessible side of the work pieces to fill the holes about the fastener and a holding member is used to hold the assembly in place so that the guide member can be removed and the conventional nut installed.

11 Claims, 7 Drawing Figures

PATENTED FEB 25 1975

FASTENER ASSEMBLY

CROSS REFERENCE TO RELATED APPLICATIONS

This application is a continuation-in-part of my copending application Ser. No. 268,478, filed July 3, 1972.

BACKGROUND OF THE INVENTION

Various devices and techniques are available on the market today that use a fastener assembly which is adapted to be installed through holes having limited accessibility from one side thereof. Most of these prior art devices and techniques have been unable to insert a fastener in a hole from the side of limited accessibility so as to obtain a precision fit between the fastener and the holes. This has caused such devices and techniques to be unsatisfactory where the joint is to carry shear loads as is generally the case in the aerospace industry. Moreover, such prior art devices have not been able to provide a guide for pulling the fastener into the holes which is both flexible and has the ability to retain a smoothly curved shape to assist in inserting the guide member through the holes from the side of limited accessibility.

SUMMARY OF THE INVENTION

These and other problems and disadvantages associated with the prior art are overcome by the invention disclosed herein by providing a fastener assembly which can be installed to a precision fit in holes having one side of limited accessibility and which provides a fastener assembly capable of carrying a bearing load once installed. Moreover, the guide member of the assembly is flexible and tends to straighten itself but is capable of being formed to a generally desired shape to assist in inserting the guide member through the holes from the side of limited accessibility.

The fastener assembly of the invention includes generally a fastener which has a shank diameter a prescribed amount less than the diameter of the holes through which the fastener is to be inserted with the head at one end and an externally threaded portion at the opposite end to be engaged for holding the fastener in position in the holes. The externally threaded end of the fastener is also internally threaded oppositely to the external threads and a guide member is threaded into the internally threaded portion of the fastener. The guide member can be inserted through the holes from the side that is readily accessible until the threaded end reaches an easily accessible position. The fastener is then screwed onto the threaded end of the guide member and the guide member pulled back through the holes to direct the fastener into the holes. The guide member is an elongate flexible member consisting of a coil spring and a wire core so that even though the coil spring tends to straighten itself at all times, the wire core can be bent to a desired shape to allow the guide member to be easily inserted through the holes and out a convenient location for the placement of the fastener onto the guide member. A sleeve member is provided which has a wall thickness just sufficient to fill the space between the hole and the fastener for a precision fit to allow the assembly to support bearing loads. The sleeve member is slipped around the fastener after it is in the holes from the easily accessible side thereof. A holding nut is provided for threading onto the external threads of the fastener to hold it in position with the sleeve member around the outside thereof and a conventional nut is provided for also being threaded onto the externally threaded end of the fastener from the accessible side of the holes to fix the fastener into position.

These and other features and advantages of the invention disclosed herein will become more apparent upon consideration of the following specification and accompanying drawings wherein like characters of reference designate corresponding parts throughout the several views and in which:

Figure 1:
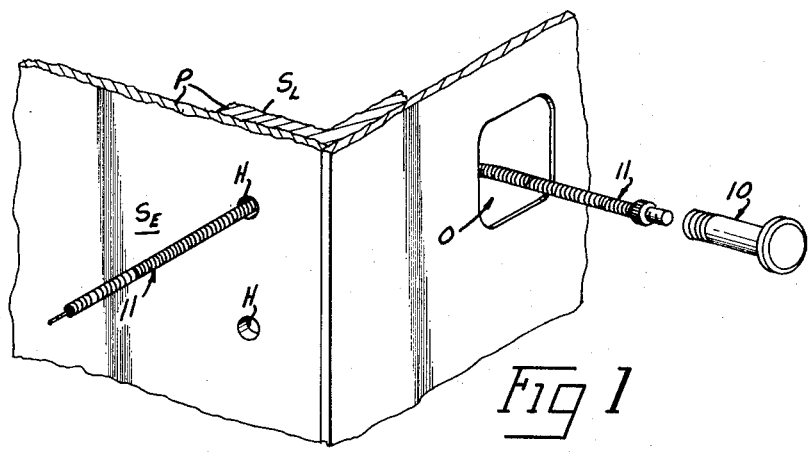
FIG. 1 is a perspective view showing the invention in use.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the drawings, it will be seen that the invention is designed for use in fastening together work pieces P with aligned holes H therethrough with one side $S_E$ of the work pieces being exposed and the opposite side $S_L$ having limited accessibility. The apparatus of the invention includes generally a fastener 10, a guide member 11, a sleeve member 12, a holding member 14, and a nut 15. In use, the holding member 11 is inserted through the holes H from the exposed side $S_E$ and out a convenient opening O some distance from the side $S_L$ having limited accessibility. The fastener 10 is attached to the guide member 11 and the guide member 11 used to pull the fastener 10 into the holes H. After this is done, the sleeve member 12 is inserted around the fastener until the sleeve member is flush with the exposed side $S_E$ of the work pieces and then the holding member is positioned onto the fastener 10 so as to hold the fastener in position. Then the guide member 11 is removed from the fastener 10 and the nut 15 installed and tightened in conventional manner to lock the fastener 10 in place. Because of the close tolerance fit between the fastener 10, sleeve member 12 and the holes H, it will be seen that the assembly A is capable of supporting the work pieces P under bearing loads.

Figure 2:
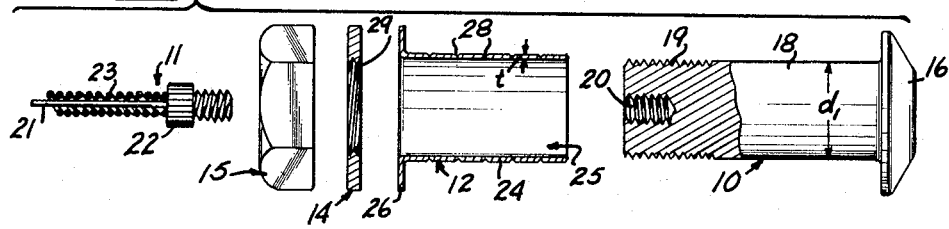
FIG. 2 is an exploded cross-sectional view showing the various components of the invention.

Referring generally to FIG. 2, it will be seen that the fastener 10 includes a head 16 integral with support shank 18 and an externally threaded engagement section 19 on the projecting end of the support shank 18. These portions of the fastener 10 are conventional as is well known in the art. The projecting end of the engagement section 19 is internally threaded as best seen in FIG. 2 and designated with the numeral 20. The support shank 18 of the fastener has a diameter $d_1$ which is a prescribed amount smaller than the diameter D of the holes H through the work pieces as will become more apparent. The internal threads 20 are oppositely directed to the external threads on the engagement portion 19.

The guide member 11 is an elongate member several feet in length and includes a central support wire 21 affixed to a threaded stud 22 at one of its ends. The threaded stud 22 can be threadedly received in the internal threads 20 of the fastener 10 as will become more apparent. Also affixed to the stud 22 and surrounding the central wire 21 is a coil wire 23, the natural resiliency of which tends to straighten the guide member 11 at all times. Thus, the guide member 11 has good flexibility provided by the coil wire 22 and sufficient strength provided by support wire 21 to allow the guide member 11 to be inserted through the holes H from the exposed side $S_E$ thereof and manually worked around until the stud 22 is pushed out of the appropriate opening O in the structure. The fastener 10 is then screwed onto the stud 22 so that the fastener 10 can be pulled into position in the holes H from the side $S_L$ having limited accessibility. Because the diameter $d_1$ of the fastener 10 is slightly smaller than the diameter D of the holes H, the guide member 11 can be used to easily pull the fastener 10 into the holes H so that the head 16 of the fastener rests against the side $S_L$ of the work pieces having limited accessibility. The grip length of the fastener 10 is such that the engagement section 19 protrudes from the exposed side $S_E$ of the work piece P as seen in FIG. 3.

The sleeve member 12 includes a seamless tubular side wall 24 defining a passage 25 therethrough and with a thickness $t$ just sufficient to fill the holes H about the support shank 18. While various thicknesses $t$ may be used, it has been found that a thickness $t$ of approximately 0.008 inch performs adequately allowing the assembly A to carry bearing loads once installed. A head flange 26 is provided at one end of the sleeve member 12 which is integral with and extends outwardly from the side wall 24. The side wall 24 has a length corresponding to the grip length of the fastener or the total thickness of the work pieces through which the assembly A is to be installed and may be provided with circumferentially extending grooves 28 at spaced points along the length of the side wall 24 as illustrated in FIG. 2 so that the length of the side wall 24 may be selectively adjustable. Because the grip length of fasteners usually run in 1/16-inch variations, the grooves 28 are usually spaced a distance of one-sixteenth inch apart along the length of the side wall 24. It will also be noted that the grooves 28 extend through planes generally normal to the centerline of the sleeve member 12 so that the projecting end of the side wall 24 will always be normal to the centerline of the sleeve member 12 and fastener 10 to assure a good fit between the sleeve member 12 and the fastener 10.

The strength of the material of the sleeve member 12 should approximately be that of the work pieces P or stronger. While various materials may be used depending on the work pieces, it has been found that aluminum alloys such as 5052 or stainless steels such as A286 preform satisfactorily.

Figure 3:
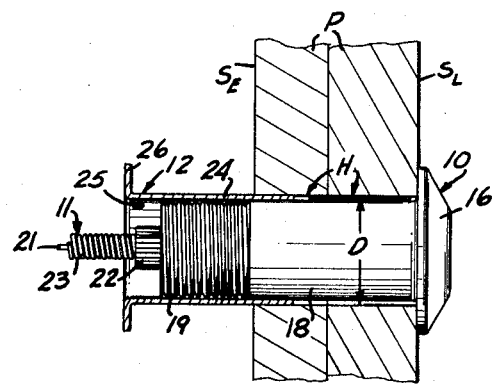
FIG. 3 is a cross-sectional view showing the invention being installed.
Figure 4:
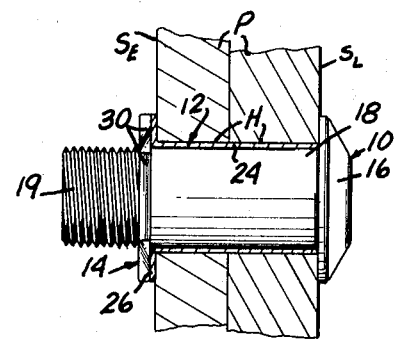
FIG. 4 is a cross-sectional view showing the invention partly installed.

After the fastener 10 has been pulled into position as shown in FIG. 3, the sleeve member 12 is inserted around the fastener 10 by placing the projecting end of the side wall 24 over the engagement section 19 of the fastener 10 and pushing the member 12 home until the back side of the head flange 26 rests against the exposed surface $S_E$ of the work pieces P as seen in FIG. 4. In this position, the projecting end of the side wall 24 should be in the proximity of the underside of the head 16 of fastener 10.

After the sleeve member 12 is seated, the holding member 14 is positioned on the engagement portion 19 to hold the fastener 10 and sleeve member 12 in place. While various holding members 14 may be used, a thin washer shaped nut is illustrated which is internally threaded at 29 to threadedly engage the engagement portion 19. There are only a few threads in member 14 such as 1½ threads so that the major tightening force by the conventional nut 15 can deform the threads 29 to insure proper tightening of the fastener in the holes. Wrenching surfaces 30 may be provided on member 14 to assist in tightening it. It will be noted that since the threads of engagement portion 19 and member 14 are oppositely directed to the internal threads 20 in fastener 10 and the threads on stud 22, the holding member 14 can be tightened without loosening the stud 22 of guide member 11.

Figure 5:
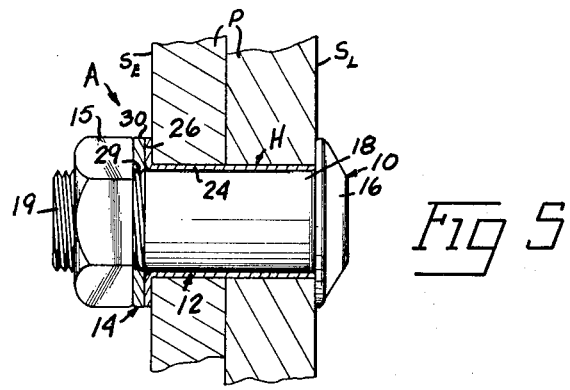
FIG. 5 is a cross-sectional view showing the invention installed.

After the holding member 14 is tightened, the fastener 10 will be held against rotation so that the guide member 11 can be unscrewed. The nut 15 is then installed in conventional manner while the fastener 10 is held against rotation by the holding member 14. The threads 29 of member 14 may be easily deformed as seen in FIG. 5 to allow nut 15 to be fully tightened. It will also be understood that the holding member 14 may be omitted if the guide member 11 is left screwed into threads 20 during the tightening of nut 15.

Figure 6:
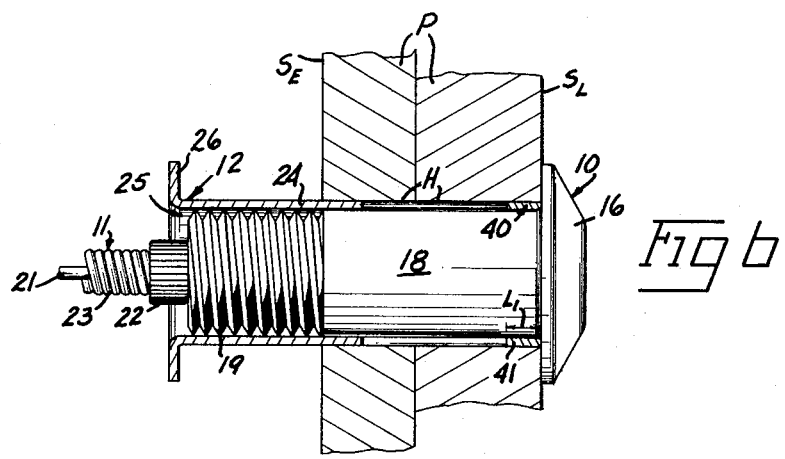
FIG. 6 is a cross-sectional view showing another embodiment of the invention; and, FIG. 7 is a cross-sectional view illustrating still another embodiment of the invention.

To insure that the fastener 10 is centered in the holes H prior to the placement of the sleeve member 10 therearound, a ring 40 as seen in FIG. 6 may be used. The ring 40 has a tubular side wall 41 which conforms in diameter and thickness to that of the side wall 24 of the sleeve member 12. The length $L_1$ of the side wall 41 is relatively short and the length of the side wall 24 of sleeve member 12 is shortened so that the combined length of ring 40 and sleeve member 12 is substantially that of the grip length of fastener 10 or the combined thickness of the work pieces P. When the side wall 24 of sleeve member 12 is grooved as indicated at 28 in FIG. 2, the side wall 24 may be severed at one of the outermost grooves 28 to form the ring 40.

The ring 40 is placed around the support shank 18 of fastener 10 prior to its attachment to guide member 11 so that when the fastener 10 is pulled into the holes H with the guide member 11 as seen in FIG. 6, the ring 40 will be received in the holes H adjacent the underside of head 16 of the fastener. This locates the fastener 10 concentrically with respect to holes H so that the sleeve member 10 that is shorter can be easily slipped around the support shank 18 from the easily accessible side $S_E$ of the work pieces P similarly to that shown in FIG. 3. The rest of the installation procedure is the same as that described above.

Figure 7:
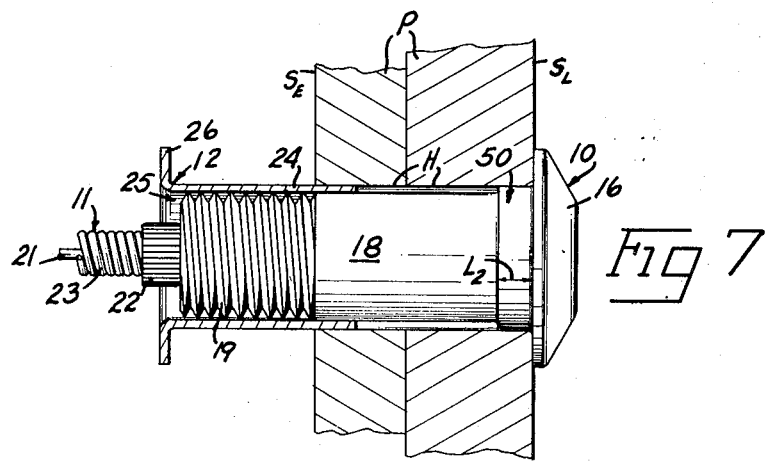

In lieu of the ring 40, a circular boss 50 may be formed on the support shank 18 of fastener 10 as seen in FIG. 7. The boss 50 is formed integral with and concentrically about shank 18, and has a length $L_2$ substantially equal to that of the ring 40. The outside diameter of the boss 50 is substantially equal to the outside diameter of the sleeve member 12 and the diameter of holes H. Using a shortened sleeve member 12 as explained with the installation of the ring 40, the installation of the fastener 10 with the boss 50 is the same as that explained for the ring 40. It is also understood that the boss 50 may be in the form of a filet with an enlarged radius.

While specific embodiments of the invention have been disclosed herein, it is to be understood that full use may be made of modifications, substitutions and equivalents without departing from the scope of the invention.

I claim:

1. An assembly for fastening together work pieces having aligned holes therethrough of a first prescribed diameter with one side of the work pieces having limited accessibility while the opposite side is easily accessible including:
   a fastener having a head at one end, a support shank of a second prescribed diameter smaller than the first prescribed diameter and an engagement portion on the projecting end of said shank;
   an elongate flexible guide member receivable through the holes and attachable to said fastener to be used to pull said fastener into said holes, engagement portion first, from the side of limited accessibility;
   a sleeve member receivable over said support shank of said fastener and within the holes from the easily accessible side of the work pieces, said sleeve member dimensioned to fill the holes about said support shank; and,
   an enlarged diameter section on said shank adjacent said head of a diameter substantially equal to said first prescribed diameter and a length substantially less than the total thickness of the work pieces to concentrically locate said smaller diameter portion of said shank within the holes when fastener is pulled into and seated within the holes.

2. The assembly of claim 1 wherein said sleeve member includes a tubular side wall and a head flange about one end of said side wall, the length of said side wall substantially equal to the combined thickness of said work pieces and the thickness of said side wall substantially equal to one-half the difference between the diameter of said holes and the diameter of said support shank so that said head flange of said tubular member rests against the easily accessible side of the work pieces when said sleeve member is inserted over said fastener.

3. The assembly of claim 2 wherein said side wall is circumferentially grooved at spaced positions along the length thereof.

4. The assembly of claim 2 wherein the difference in diameter of said support shank and the holes is in the order of 0.016 inch and the thickness of said side wall is in the order of 0.008 inch.

5. The assembly of claim 1 wherein said guide member includes a central non-extendable support wire and a coil spring wire encircling said support, said support wire and said coil spring wire both being attachable to said fastener.

6. The assembly of claim 5 wherein said engagement portion of said fastener is externally threaded and internally threaded in the projecting end thereof oppositely to said external threads, and wherein said guide member further includes a threaded stud adapted to threadedly engage said internal threads in said fastener and to which said support wire and said coil spring wire are attached.

7. The assembly of claim 1 further including a secondary holding member and a nut internally threaded to threadedly engage said external threads of said engagement portion of said fastener to finally install same, said secondary holding member being internally threaded with substantially fewer threads than said nut to threadedly engage said engagement portion of said fastener prior to said nut to hold said fastener and said sleeve member in place until said nut is tightened, said threads on said holding member being sufficiently low in overall strength to allow said nut to deform said threads of said holding member when said nut is tightened.

8. The assembly of claim 1 wherein said enlarged diameter section includes a ring having an inside diameter substantially equal to said second prescribed diameter and an outside diameter substantially equal to said first prescribed diameter.

9. The assembly of claim 1 wherein said enlarged diameter section includes a boss integral with said shank and defining an outside surface concentrically oriented with respect to the smaller diameter outside surface of said shank and of a diameter substantially equal to the first prescribed diameter 10. An assembly for fastening together work pieces having aligned holes therethrough of a first prescribed substantially constant diameter with one side of the work pieces having limited accessibility while the opposite side is easily accessible including:
   a fastener having a head at one end, a support shank of a second prescribed substantially constant diameter along its length smaller than the first prescribed diameter and engagement portion on the projecting end of said shanks; said engagement portion externally threaded and internally threaded in the projecting end thereof oppositely oriented to said external threads;
   an elongate flexible guide member receivable through the holes and attachable to said fastener to be used to pull said fastener into said holes, engagement portion first, from the side of limited accessibility, said guide member comprising a threaded stud adapted to threadedly engage said internal threads in said engagement portion of said fastener, a central non-extendable flexible support wire attached to said stud, and a coil spring wire encircling said support wire and attached to said stud to control the flexibility of said guide member;
   a sleeve member receivable over said support shank of said fastener and within the holes from the easily accessible side of the work pieces, said sleeve member comprising a tubular side wall with a substantially constant diameter along its length and a head flange about one end of said side wall, the thickness of said side wall substantially equal to one-half the difference between the diameter of said holes and the diameter of said support shank so that said sleeve member can be inserted over said support shank of said fastener and within the holes;
   a nut internally threaded to threadedly engage said external threads on said engagement portion of said fastener to finally install same; and a secondary holding member internally threaded with substantially fewer threads than said nut to threadedly engage said engagement portion of said fastener prior to installation of said nut to hold said fastener and said sleeve member in place until said nut is tightened, said threads on said holding member being sufficiently low in overall strength to allow said nut to deform said threads of said holding member when said nut is tightened.

11. The assembly of claim 10 wherein said side wall of said sleeve member has a length at least that of said shank portion of said fastener and circumferentially externally grooved at spaced positions along the length thereof so that the length of said side wall can be adjusted to the length of said shank portion of said fastener.

* * * * *